US012603867B2

(12) United States Patent
Chigurupati et al.

(10) Patent No.: US 12,603,867 B2
(45) Date of Patent: Apr. 14, 2026

(54) ENHANCED SASE NETWORK PROCESSING NODE HIGH AVAILABILITY

(71) Applicant: Palo Alto Networks, Inc., Santa Clara, CA (US)

(72) Inventors: Prasad Chigurupati, Fremont, CA (US); Srinivasan Komandoor Santhanam, Sunnyvale, CA (US); Naveen Bombarsnahalli Neelakanta, Mountain House, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 109 days.

(21) Appl. No.: 18/777,147

(22) Filed: Jul. 18, 2024

(65) Prior Publication Data

US 2026/0025365 A1 Jan. 22, 2026

(51) Int. Cl.
*H04L 9/40* (2022.01)
*H04L 47/125* (2022.01)

(52) U.S. Cl.
CPC .......... *H04L 63/029* (2013.01); *H04L 47/125* (2013.01); *H04L 63/20* (2013.01)

(58) Field of Classification Search
CPC ...... H04L 63/029; H04L 47/125; H04L 63/20
See application file for complete search history.

(56) References Cited

U.S. PATENT DOCUMENTS

| | | | | |
|---|---|---|---|---|
| 7,571,343 B1 * | 8/2009 | Xiang | ................. | H04L 63/0272 |
| | | | | 714/2 |
| 10,257,167 B1 * | 4/2019 | Matthews | ........... | H04L 12/4641 |

| | | | | |
|---|---|---|---|---|
| 10,498,529 B1 * | 12/2019 | Hashmi | ................. | H04L 9/0618 |
| 10,601,779 B1 * | 3/2020 | Matthews | ............. | H04L 67/141 |
| 10,771,476 B2 * | 9/2020 | Thubert | ................. | H04L 47/32 |
| 2012/0281522 A1 * | 11/2012 | Kumar | ................. | H04L 1/1809 |
| | | | | 370/217 |
| 2015/0237069 A1 * | 8/2015 | Rochon | ................... | H04L 47/34 |
| | | | | 726/4 |
| 2015/0304282 A1 * | 10/2015 | Xu | ....................... | H04L 63/0272 |
| | | | | 713/153 |
| 2019/0173920 A1 * | 6/2019 | Gopal | ................... | H04L 63/205 |
| 2019/0297533 A1 * | 9/2019 | Liedes | ................. | H04W 28/10 |
| 2022/0215101 A1 * | 7/2022 | Rioux | ................... | G06F 21/577 |
| 2023/0269191 A1 * | 8/2023 | Mestery | ............. | H04L 63/0227 |
| | | | | 370/235 |

(Continued)

OTHER PUBLICATIONS

6WIND, 6WIND: Virtualized Networking Software | Cloud-Native Solutions, downloaded Jul. 11, 2024, pp. 1-6.

(Continued)

*Primary Examiner* — Darren B Schwartz

(74) *Attorney, Agent, or Firm* — Van Pelt, Yi & James LLP

(57) ABSTRACT

Various techniques for enhanced SASE network processing node (NPN) IPSec high availability are disclosed. In some embodiments, a system, a process, and/or a computer program product for enhanced SASE NPN IPSec high availability includes monitoring a plurality of secure tunnels at an active network processing node (NPN); synchronizing periodically from the active NPN to a standby NPN; and processing each of the plurality of secure tunnels at the standby NPN using a predicted sequence number for an anti-replay sequence window for each of the plurality of secure tunnels after a failover event from the active NPN to the standby NPN.

15 Claims, 5 Drawing Sheets

Single IP RN NPN Termination (Securing Branches)

(56) References Cited

U.S. PATENT DOCUMENTS

2025/0119471 A1* 4/2025 Parla ................... H04L 12/4633

OTHER PUBLICATIONS

Amazon Web Services, Load Balancer—Elastic Load Balancing (ELB)—AWS, downloaded Jul. 10, 2024, pp. 1-7.
Red Hat, 6WIND Virtual Service Router (VSR), Red Hat Ecosystem Catalog, downloaded Jul. 11, 2024, pp. 1-6.
StrongSwan, strongSwan Documentation, ha Plugin, downloaded Jul. 10, 2024, pp. 1-2.
Zhang et al., IPsec Anti-Replay Algorithm without Bit Shifting, RFC 6479, Jan. 2012, pp. 1-9.

* cited by examiner

Single IP RN NPN Termination (Securing Branches)

FIG. 2

NPN IPSec HA (SA Sequence number sync)

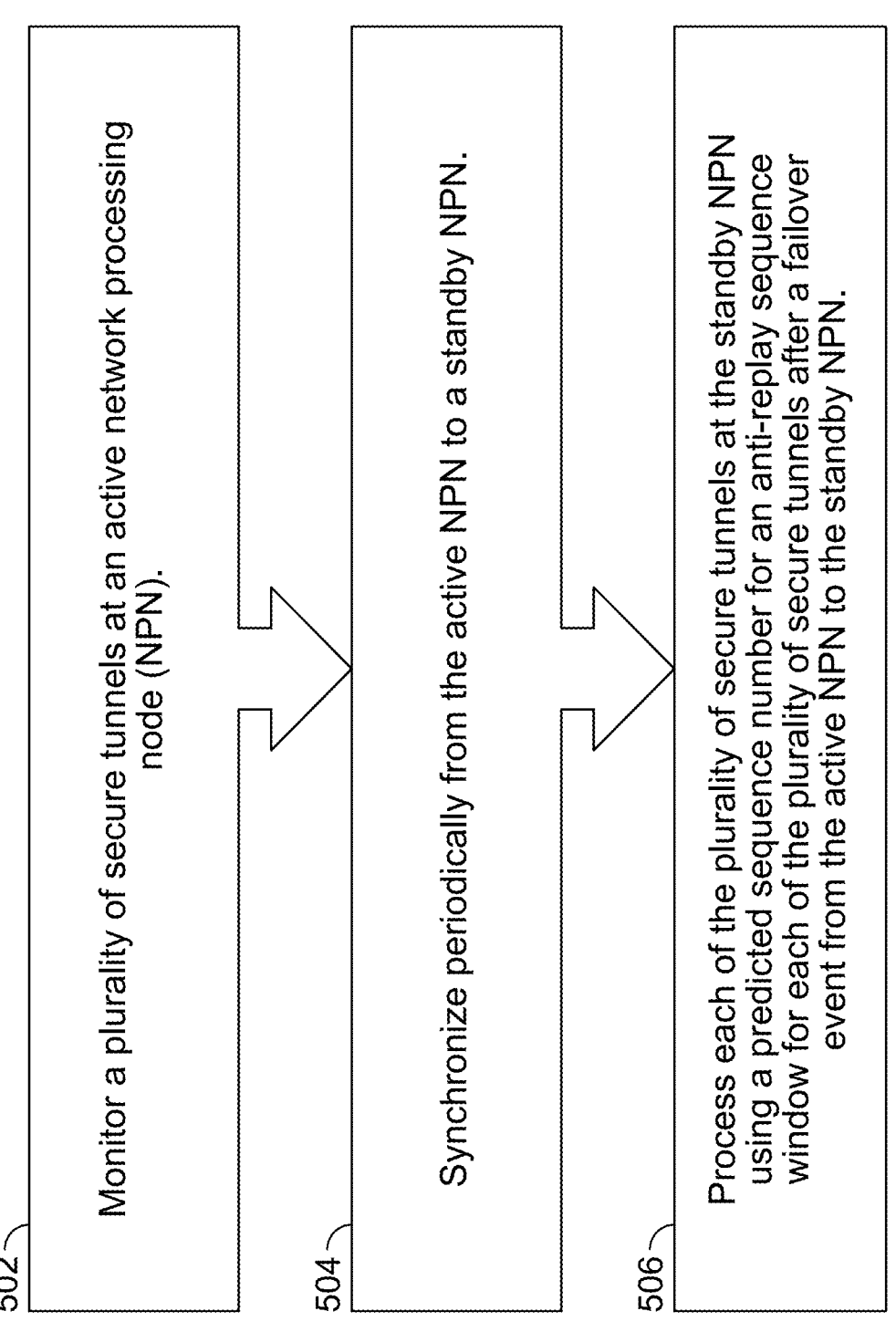

502 — Monitor a plurality of secure tunnels at an active network processing node (NPN).

504 — Synchronize periodically from the active NPN to a standby NPN.

506 — Process each of the plurality of secure tunnels at the standby NPN using a predicted sequence number for an anti-replay sequence window for each of the plurality of secure tunnels after a failover event from the active NPN to the standby NPN.

FIG. 5

ENHANCED SASE NETWORK PROCESSING NODE HIGH AVAILABILITY

BACKGROUND OF THE INVENTION

Secure tunneling protocols for the Internet Protocol (IP) exist. For example, IPsec is an existing secure tunneling protocol for IP traffic.

Anti-replay is a sub-protocol of IPsec that is part of Internet Engineering Task Force (IETF), which is provided at RFC 6479 (e.g., publicly available at https://datatracker.ietf.org/doc/html/rfc6479). The anti-replay sub-protocol is designed to prevent hackers from being able to inject or make changes in packets that travel from a source to a destination without being detectable. Specifically, the anti-replay protocol uses a unidirectional security association in order to establish a secure connection between two nodes in the network. Once a secure connection is established, the anti-replay protocol uses packet sequence numbers to effectively prevent such replay attacks.

BRIEF DESCRIPTION OF THE DRAWINGS

Various embodiments of the invention are disclosed in the following detailed description and the accompanying drawings.

FIG. 2 illustrates a system diagram for a single IP Remote Network (RN) Network Processing Node (NPN) termination (securing branches) in accordance with some embodiments.

FIG. 5 is a flow diagram for a process for enhanced SASE NPN IPSec high availability in accordance with some embodiments.

DETAILED DESCRIPTION

Figure 1:
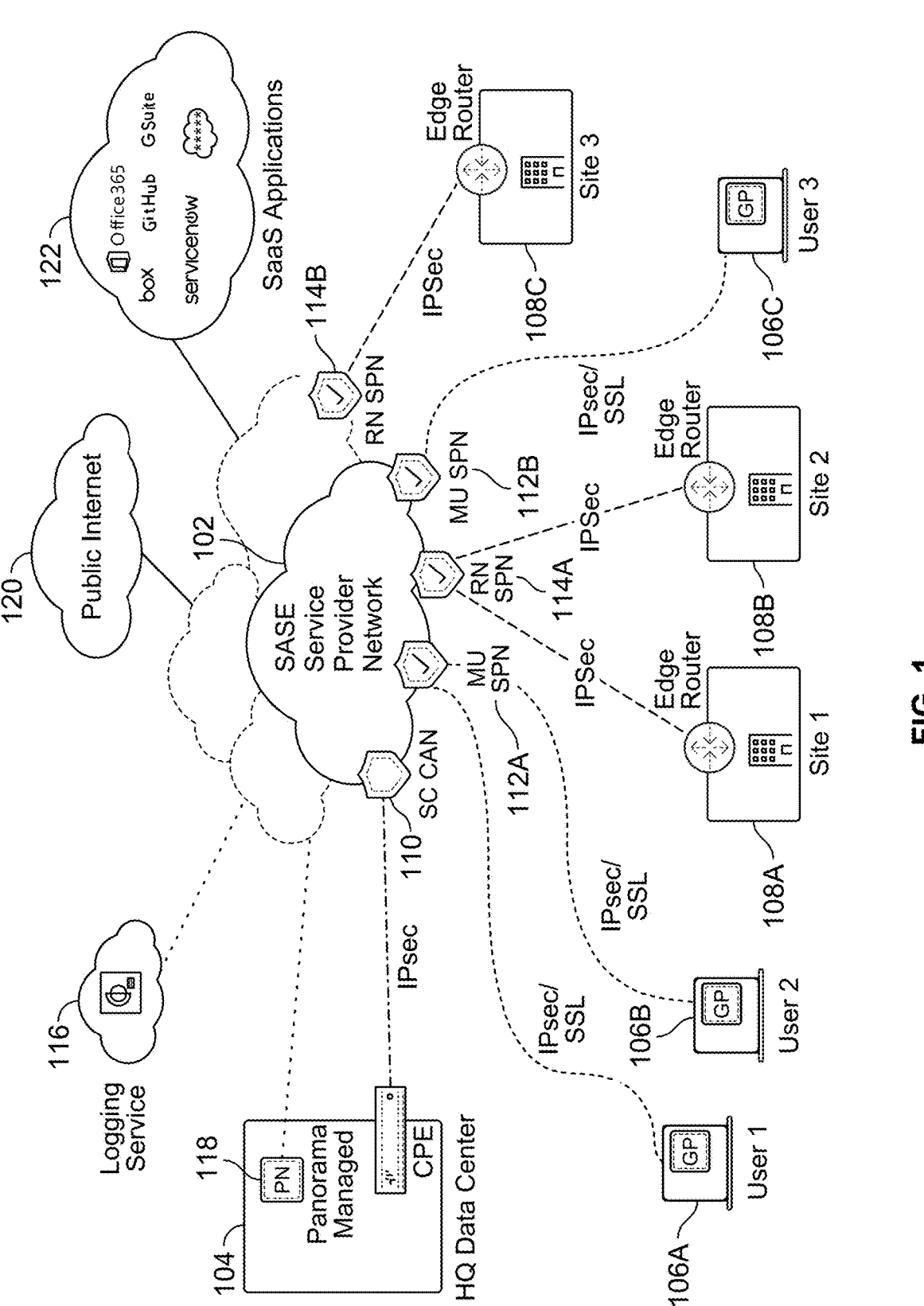
FIG. 1 illustrates an example Secure Access Service Edge (SASE) network environment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure tunneling for the Internet Protocol (IP) exists. For example, IPsec is an existing secure tunneling protocol for IP traffic.

Anti-replay is a sub-protocol of IPsec that is part of Internet Engineering Task Force (IETF), which is provided at RFC 6479 (e.g., publicly available at https://datatracker.ietf.org/doc/html/rfc6479). The main goal of anti-replay is to avoid hackers injecting or making changes in packets that travel from a source to a destination. Anti-replay protocol uses a unidirectional security association in order to establish a secure connection between two nodes in the network. Once a secure connection is established, the anti-replay protocol uses packet sequence numbers to defeat replay attacks as follows: When the source sends a message, it adds a sequence number to its packet; the sequence number starts at 0 and is incremented by 1 for each subsequent packet. The destination maintains a 'sliding window' record of the sequence numbers of validated received packets; it rejects all packets which have a sequence number which is lower than the lowest in the sliding window (i.e., too old) or already appears in the sliding window (e.g., duplicates/replays). Accepted packets, once validated, update the sliding window (e.g., displacing the lowest sequence number out of the window if it was already full).

However, various other IPsec related security challenges exist for network/security providers.

Overview of Techniques for Enhanced SASE Network Processing Node IPSec High Availability As an example, for a Service Access Service Edge (SASE) computing environment, IKE and IPSec Security Associations (SA) are synchronized between Active and Backup IPsec termination nodes (e.g., referred to herein as network processing nodes (NPNs)) with the objective to provide branch/remote networks data traffic continuity for existing data flows/clients to server sessions. IPSEC SA transmit and receive sequence numbers that generally are synced from Active to Backup periodically for data packet anti-replay checks on newly active after IPSec tunnel fail over. There typically exists a lag between a data plane active node failure and when newly active nodes can start processing data packets. As a result, this presents a technical challenge of how to estimate the newly active node IPSec SA transmit and receive sequence numbers.

Existing approaches typically utilize a sequence number for every n packets (e.g., a fixed n value) and bump the sequence number by a fixed value of m upon switchover for all the IPSEC tunnels for a failover event to transition the IPSec tunnels from an active Network Processing Node (NPN) to a standby NPN. As a result, there often will be multiple tunnels/branches terminated on an NPN and packets per second (pps) generally depends on branch size and also branch pps at the time of switchover. As such, the shortcoming of this existing approach is that it fails to consider the pps when setting the sequence number during the switchover from the active NPN to the standby NPN. This can then result in packet drops due to anti-replay window checks and IPSec tunnels will flap after the switchover.

Thus, new and improved solutions for enhanced SASE network processing node (NPN) IPSec high availability are needed.

Accordingly, various techniques for enhanced SASE network processing node (NPN) IPSec high availability are disclosed.

For example, the disclosed techniques can also avoid the above-described problem of data packet drops after an IPSec tunnel failover from an active NPN to a backup/standby NPN, such as will be further described below with respect to various embodiments.

In some embodiments, a system, a process, and/or a computer program product for enhanced SASE NPN IPSec high availability includes monitoring a plurality of secure tunnels at an active network processing node (NPN); synchronizing periodically from the active NPN to a standby NPN; and processing each of the plurality of secure tunnels at the standby NPN using a predicted sequence number for an anti-replay sequence window for each of the plurality of secure tunnels after a failover event from the active NPN to the standby NPN.

In one embodiment, the predicted sequence number for the anti-replay sequence window for each of the plurality of secure tunnels is weighted for a recency bias.

In one embodiment, the active NPN and the standby NPN are associated with a Secure Access Service Edge (SASE) network, wherein the SASE network includes a plurality of security processing nodes (SPNs), wherein branch flows are assigned by a load balancer for security processing at one of the plurality of the SPNs, and wherein synchronizing periodically from the active NPN to a standby NPN.

In some embodiments, a system, a process, and/or a computer program product for enhanced SASE NPN IPSec high availability further includes periodically synchronizing an IPSec sequence number for each of a plurality of branch flows from the active NPN to the standby NPN; and periodically synchronizing a security association (SA) for each of a plurality of branch flows from the active NPN to the standby NPN. For example, each of the plurality of branch flows can be assigned to one of a plurality of security processing nodes (SPNs) of the SASE network environment for security processing (e.g., using an elastic load balancer (ELB) to assign each of the branch flows to one of the SPNs).

As such, the disclosed techniques for enhanced SASE NPN IPSec high availability reduce the probability of IPSec tunnel anti replay packet drops.

Further, the disclosed techniques for enhanced SASE NPN IPSec high availability eliminate/minimize the SASE connectivity interruption for the end users during switchover.

Moreover, as such, the disclosed techniques for enhanced SASE NPN IPSec high availability can facilitate a seamless failover from the active to the standby NPN with no packet drops during horizontal and vertical NPN scale up down events, that is, by reducing IPSec anti-replay packet drops.

Additional system embodiments and techniques for enhanced SASE NPN IPSec high availability will now be further described below.

Example System Embodiments for Enhanced SASE Network Processing Node IPSec High Availability FIG. 1 illustrates an example Secure Access Service Edge (SASE) network environment in accordance with some embodiments. Generally, Secure Access Service Edge (SASE) is a cloud architecture model that combines network and security-as-a-service functions together and delivers them as a single cloud service.

Specifically, in this example implementation, the SASE service provider network is shown at 102 (e.g., using a commercially available SASE solution, Prisma Access®, from Palo Alto Networks, Inc., headquartered in Santa Clara, CA, or another commercially/publicly available SASE solution can similarly be used). An enterprise/corporate headquarters (HQ) data center 104 (e.g., including Customer Premises Equipment (CPE) as shown in FIG. 1) is in communication with the SASE service provider network via a Service Connection (SC) for a Corporate Access Node (CAN) as shown at 110. Various mobile users 106A, 106B, and 106C (e.g., executing an SASE endpoint/VPN agent, such as Global Protect® (shown as GP in FIG. 1), from Palo Alto Networks, Inc., headquartered in Santa Clara, CA, or another commercially/publicly available SASE endpoint/VPN agent solution can similarly be used, which can implement various Host Information Profile (HIP) related security) are in communication with the SASE service provider network via Mobile User (MU) Security Processing Nodes (SPNs) as shown at 112A and 112B. Remote/branch sites 108A, 108B, and 108C (e.g., via edge routers as shown in FIG. 1) are in communication with the SASE service provider network via Remote Network (RN) SPNs as shown at 114A and 114B. More specifically, as shown in FIG. 1, each of these connections from the data center, mobile users, and remote sites are in secure communication with the SASE service provider network via IPsec or SSL secure protocol communications (e.g., to secure user/data traffic between the data center(s), mobile users, and remote/branch sites, etc., and the SASE network).

As also shown in FIG. 1, a logging service 116 is provided for the SASE service provider network 102. In an example implementation, the logging service is provided using the Strata Logging Service (e.g., a commercially available logging service from Palo Alto Networks, Inc., headquartered in Santa Clara, CA, or another commercially/publicly available logging service can similarly be used), which is a cloud-delivered, scalable, and secure log storage service that can ingest, store, and forward logs from various SASE/network/security related products and services, including the Prisma Access SASE service provider network in this example implementation, as well as hardware and software Network Gateway Firewalls (NGFWs) (e.g., MU SPNs 112A and 112B, and RN SPNs 114A and 114B can be implemented using such hardware and/or software-based NGFWs, such as commercially available from Palo Alto Networks, Inc., headquartered in Santa Clara, CA, or another commercially/publicly available NGFW solution can similarly be used), and Cloud NGFW for a cloud computing service provider (e.g., Amazon Web Services (AWS) or another commercially/publicly available cloud computing service provider can similarly be used). For example, the Strata Logging Service® seamlessly integrates with Panorama as shown at 118, which is a commercially available firewall/security platform management solution that is commercially available from Palo Alto Networks, Inc., headquartered in Santa Clara, CA or another commercially/publicly available firewall/security platform management solution can be similarly used. For example, Panorama® can be used to manage all of the network environment's firewalls irrespective of their location (e.g., at the perimeter, in a data center, or in the cloud) and can use APIs and Dynamic Address Groups for automated policy workflows that adapt to changes, such as additions, moves, or deletions of servers. Once configured, users can view all logs in Panorama and Strata Cloud Manager (not shown) for the logging service 116.

The SASE service provider network 102 facilitates security policy enforcement and network access for the data center 104, mobile users 106A-C, and remote/branch sites 108A-C, including access to the public Internet as shown at 120 and various Software as a Service (SaaS) applications as shown at 122 (e.g., Office365, box, GitHub, G Suite, ServiceNow, Salesforce, etc.).

Figure 2:
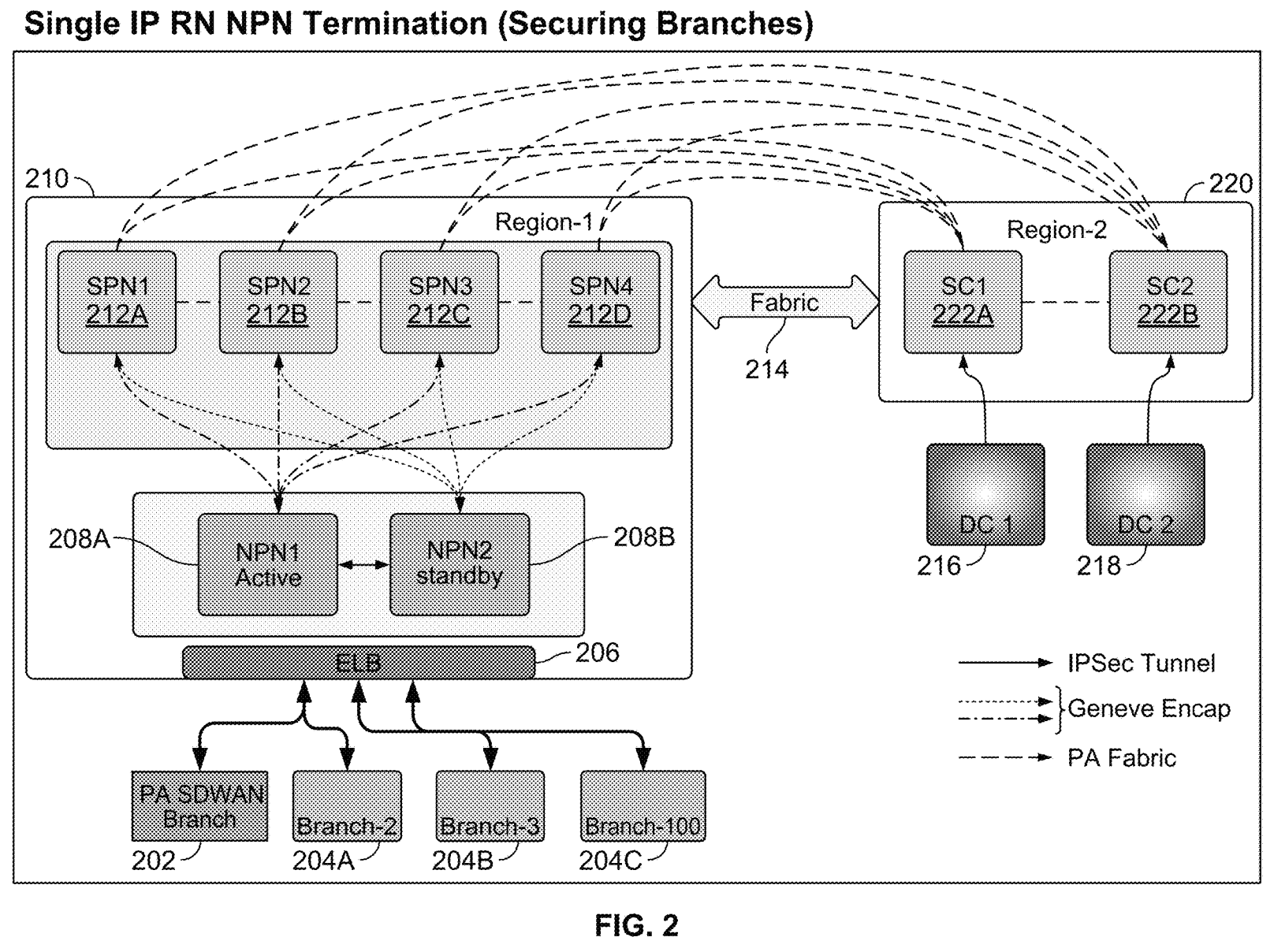

FIG. 2 illustrates a system diagram for a single IP Remote Network (RN) Network Processing Node (NPN) termination (securing branches) in accordance with some embodiments. In an example implementation, FIG. 2 illustrates the single IP RN NPN (e.g., network processing node) termination securing branches, such as branches 108A and 108B as shown in FIG. 1.

Referring to FIG. 2, an SASE (e.g., Prisma Access (PA)) SDWAN branch 202 as well as other branches shown at 204A, 204B, and 204C are in communication with a Region-1 210 via IPSec Tunnels to an Elastic Load Balancer (ELB) 206. In an example implementation, the ELB is provided by a Google Cloud Platform (GCP) implemented ELB that automatically distributes incoming application traffic across multiple targets and virtual appliances in one or more Availability Zones (AZs). Also, Data Centers (DCs) 216 and 218 are in communication with SC1 222A and SC2 222B (e.g., which are also in inter-communication via SASE/PA fabric as shown), respectively, of a Region-2 220, and Region-2 220 is connected to a Region-1 via Fabric (e.g., high-speed connectivity) 214 as shown in FIG. 2.

As also shown in FIG. 2, Region-1 210 includes an NPN1 (active node) 208A and an NPN2 (standby node) 208B. Specifically, in this example implementation, rather than performing both the network and security processing in the SPNs, the network processing and the security processing are split as the network processing is performed using the NPNs shown at 208A (active NPN) and 208B (standby NPN) and the security processing (e.g., inspection of the packets/traffic for each session based on a security policy, such as for malware, intrusion detection/prevention, phishing, advanced threat prevention (ATP), etc.) is performed by the SPNs as shown at 212A, 212B, 212C, and 212D (e.g., which are also in inter-communication via SASE/PA fabric as shown), which are each in communication via Geneve Encapsulated tunnels with the active NPN 208A and have failover connections to the standby NPN 208B as shown in FIG. 2.

More specifically, the branches (202, 204A-C) are in secure communication with the active NPN (208A) via IPSec tunnels, and the IPSec tunnel termination is performed at the active NPN 208A, which will receive the IP address for the session. The active NPN 208A will also decrypt the packets (e.g., if encrypted), and forward the decrypted packets of the session to one of the SPNs based on information from the ELB 206. More specifically, the NPNs route the same sessions to the same SPNs (e.g., session 1 packets routed to SPN1 212A, session 2 packets routed to SPN2 212B, session 3 packets routed to SPN3 212C, and session 4 packets routed to SPN4 212D, etc.), which is more efficient as the SPNs will have the history/state information associated with previous packets processed for the respectively allocated sessions. Moreover, this division of the network processing functionality by the NPNs and the security processing by the SPNs facilitates enhanced bandwidth and performance of limited compute and memory resources for security processing by the SPNs. As shown in FIG. 2, there will typically be a greater number of SPNs for security processing than NPNs for network processing. These NPNs and SPNs can be implemented as container-based entities executing in the GCP regions (e.g., various regions can include the Americas (including US West, US Central, US East, etc.), Asia, Europe, India, etc.) for a software-defined networking (SDN) based solution.

The handling of an NPN failover event (e.g., if NPN1 208A goes down or is unavailable, and network processing is to then be handled by NPN2 208B) will now be described below with respect to FIG. 3.

Figure 3:
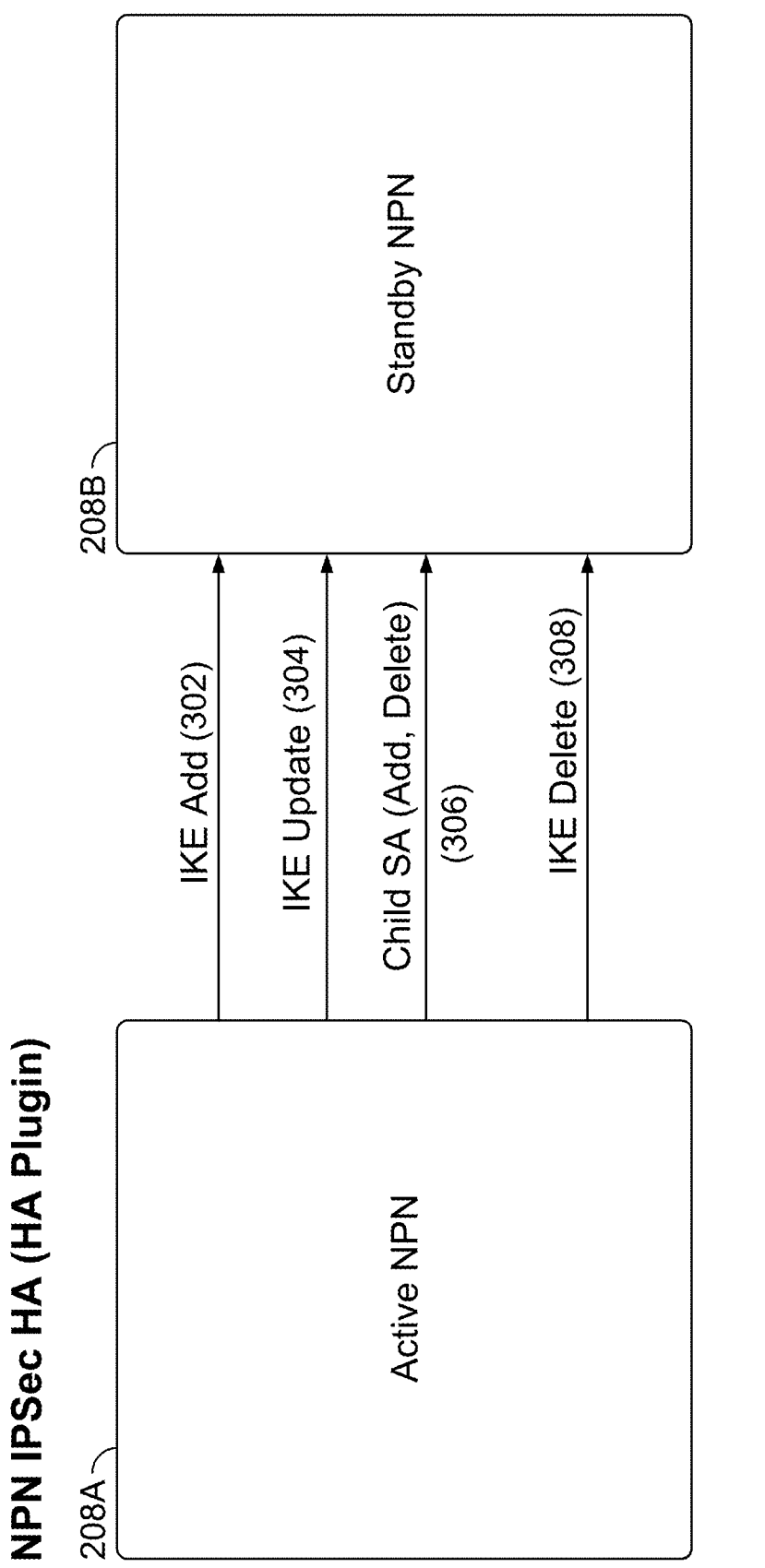
FIG. 3 illustrates a protocol diagram for an NPN IPSec High Availability (HA) solution in accordance with some embodiments.

FIG. 3 illustrates a protocol diagram for an NPN IPSec High Availability (HA) solution in accordance with some embodiments. In an example implementation, FIG. 3 illustrates an NPN IPSec HA solution using an HA plugin as will be further described below.

For example, assume that the active NPN 208A goes down (e.g., for either a software failure, a GCP failure, or any other reason), and the standby NPN 208B is waiting in hot standby mode, such as similarly described above with respect to FIG. 2. In the event that the 'active' NPN 208A is down, then the load balancer (e.g., ELB 206 as shown in FIG. 2) will start forwarding traffic from the branches (e.g., branches 202, 204A-C as shown in FIG. 2) to 'standby' NPN 208B, which will become the active NPN in this scenario.

However, the technical challenge is that the IPSec tunnel related (e.g., branch tunnel) information is needed on the 'standby' NPN 208B for each of the sessions (e.g., each of the network traffic flows, also referred to simply as flows). As described above with respect to FIG. 2, the IPSec tunnel information and the SPN associations for each of the sessions/flows are maintained at the 'active' NPN 208A, and as such, there is need to have this information replicated/synchronized at the 'standby' NPN 208B to facilitate a seamless failover from NPN 208A to NPN 208B in the event that NPN 208A goes down/is unavailable for any reason.

As such, the IPSec tunnel information and the SPN associations can be periodically synchronized from the 'active' NPN 208A to the 'standby' NPN 208B. In an example implementation, for each new IPsec/branch tunnel, the new IPSec tunnel information and its security associations (e.g., referred to herein as child security associations (SA)) are synchronized from the 'active' NPN 208A to the 'standby' NPN 208B. In this example implementation, these synchronization actions/communications are implemented using a Strongswan HA Plugin (e.g., a publicly available HA plugin, which is available at https://docs.strongswan.org/docs/5.9/plugins/ha.html, or another commercially/publicly available HA plugin can similarly be used) executed on each of the NPNs, in this example, the 'active' NPN 208A to the 'standby' NPN 208B.

Referring to FIG. 3, as shown at 302, a synchronization for a new IPSec/branch tunnel is provided using an IKE Add communication from the 'active' NPN 208A to the 'standby' NPN 208B. For example, for each new branch flow, the IKE Add synchronization operation can be performed.

As shown at 304, a synchronization for an update to an existing IPSec/branch tunnel is provided using an IKE Add communication from the 'active' NPN 208A to the 'standby' NPN 208B. For example, for each existing branch flow for which there is a state change (e.g., any update to state objects, such as IKE SA lifetime expiry, IKE reauthentication, etc.), the IKE Add synchronization operation can be performed.

As shown at 306, a synchronization for adding/deleting child security association (SA) information for an existing IPSec/branch tunnel is provided using a Child SA (Add, Delete) communication from the 'active' NPN 208A to the 'standby' NPN 208B. For example, for each branch flow in which there is a newly added security association with a given SPN for security processing or a newly removed security association with a given SPN for security processing, the IKE Child SA (Add, Delete) synchronization operation can be performed.

As shown at 308, a synchronization for deleting/removing an existing IPSec/branch tunnel is provided using an IKE Delete communication from the 'active' NPN 208A to the 'standby' NPN 208B. For example, for each existing branch flow that is terminated (e.g., the branch flow/session ends/connection is terminated or is dropped, such as based on a security policy performed by the associated SPN for that branch flow/session, etc.), the IKE Delete synchronization operation can be performed.

The above-described automated synchronization between the active NPN 208A and the standby NPN 208B facilitates a seamless failover of the network flows/sessions from the active NPN 208A to the standby NPN 208B without interruption in the event that the active NPN 208A goes down/is unavailable. As described above, the synchronization of information between the active and standby NPNs includes the relevant IPSec tunnel information for each of the branch flows/sessions as well as the security associations for SPN processing as similarly described above. An example implementation of the storing/caching of the synchronized information at the standby NPN will be further described below with respect to FIG. 4.

Figure 4:
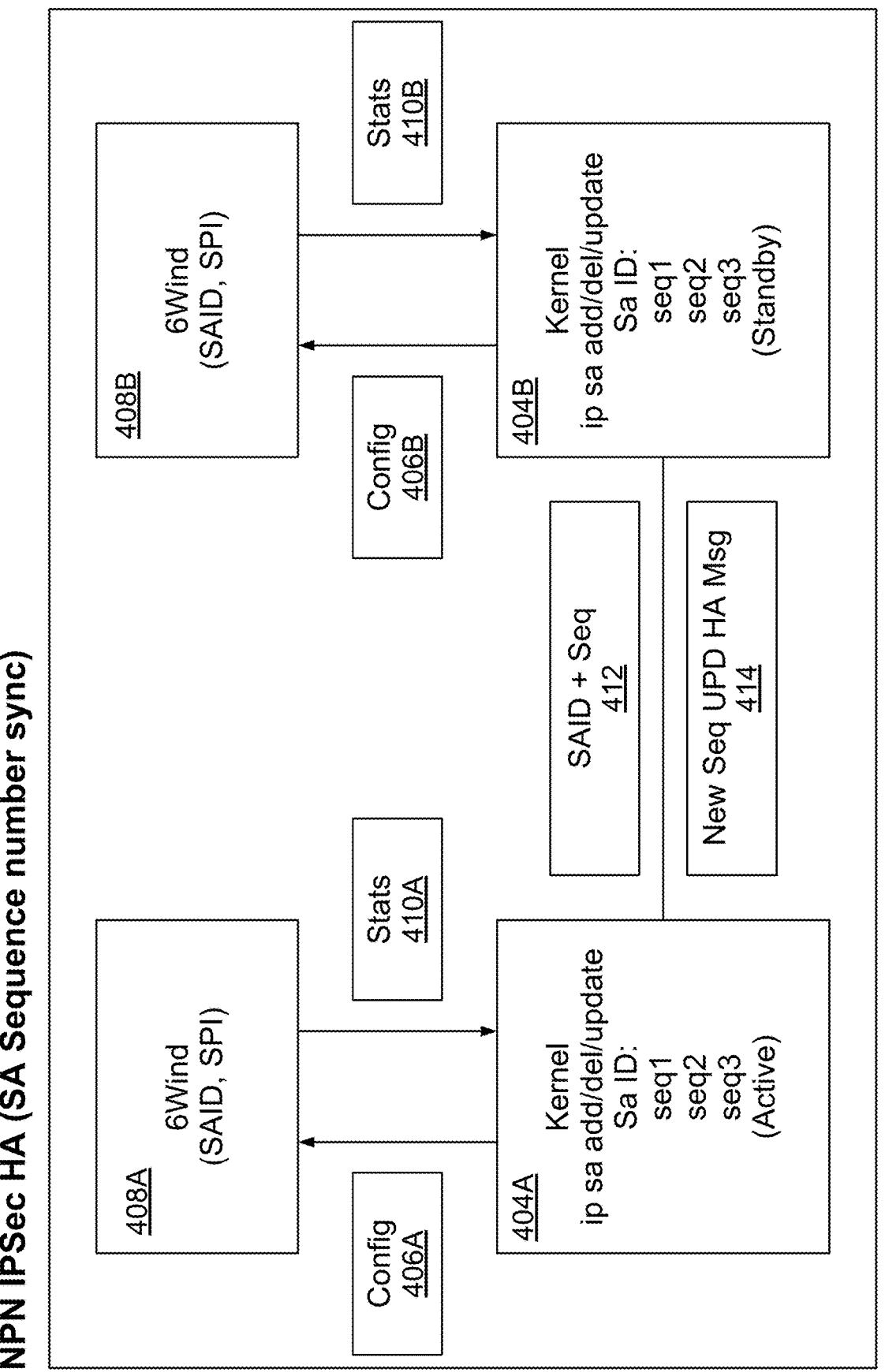
FIG. 4 illustrates a component diagram for an NPN IPSec HA solution for a Security Association (SA) sequence number synchronization (sync) in accordance with some embodiments.

FIG. 4 illustrates a component diagram for an NPN IPSec HA solution for a Security Association (SA) sequence number synchronization (sync) in accordance with some embodiments. In an example implementation, FIG. 4 illustrates the components and data flows including the caching/storage of such information for an NPN IPSec HA solution for an SA sequence number sync as will be further described below. Specifically, an example implementation of the storing/caching of the synchronized information at the standby NPN will be further described below with respect to FIG. 4.

Referring to FIG. 4, a subset of the components of an active NPN (e.g., such as active NPN 208A as shown in FIGS. 2 and 3) and a standby NPN (e.g., such as standby NPN 208B as shown in FIGS. 2 and 3) are shown. In this example implementation, each of the active and standby NPNs include a Linux Kernel as shown at 404A and 404B, respectively. As shown, the relevant state objects, including for SA, are shown as SA ID, and IPSec sequence numbers for each of the branch flows are shown as seq1, seq2, seq3. As described above, synchronization of the state objects includes the IPSec sequence numbers to facilitate implementation of the above-described IETF RFC 6479 for the anti-replay attacks for the IPSec protocol.

As also shown, a 6WIND Virtual Service Router (VSR) is provided at 408A and 408B for the active and standby NPNs. The 6WIND VSR is a publicly available high-performance and scalable virtualized software router optimized for service providers and enterprises, which is available from 6Wind at https://www.6wind.com/, or another publicly/commercially available VSR can be similarly used, such as the Red Hat Ecosystem Catalog at https://catalog.redhat.com/software/container-stacks/detail/640f27-c872393c918f83d0e6, or other such VSRs are also available. The 6Wind VSR component provides a DPDK user plane for forwarding for the TCP/IP networking stack, which receives updates from the kernel (e.g., Linux kernel), such as configuration updates as shown at 406A and 406B from kernels 404A and 404B, respectively, as well as the statistics (stats) as shown at 410A and 410B received from the 6Wind VSR components 408A and 408B, respectively.

More specifically, the above-described synchronization commands from the active NPN to the standby NPN, including IKE Add (302), IKE Update (304), Child SA (Add, Delete) (306), and IKE Delete (308) commands as described above and shown in FIG. 3, trigger the kernel communications of SA ID and IPSec sequence number (Seq) as shown at 412 or the New Seq update (UPD) HA message (Msg) 414 as shown in FIG. 4. These commands update the corresponding state objects stored in the kernel of the standby NPN, which are then provided as Config updates 406B for storing in the cache of the user plane of the 6WIND VSR 408B. As such, using this solution we can provide the synchronization commands for updating the standby kernel of the NPN and utilize such automated updates to the 6WIND VSR component as such updates to the kernel automatically trigger the above-described Config updates to the 6WIND VSR component. Thus, we maintain such state object synchronization at the kernel level and such is automatically updated/maintained at the user plane level provided via the 6WIND VSR component.

In an example implementation, a data structure for storing these state objects is provided below.

Linux Replay Kernel State Data:
  xfrm_replay_state_esn
  struct xfrm_replay_state_esn {
  unsigned int bmp_len;
  _u32 oseq;
  _u32 seq;
  _u32 oseq_hi;
  _u32 seq_hi;
  _u32 replay_window;
  _u32 bmp[0];
  }

As similarly described above, periodic synchronization of the state objects (e.g., every two seconds or some other time period) includes the IPSec sequence numbers to facilitate implementation of the above-described IETF RFC 6479 for the anti-replay attacks for the IPSec protocol (e.g., for detecting/preventing various potential replay attacks, such as could be used for a Denial of Service (DoS) attack, etc.). Specifically, the IPSec sequence numbers as well as security associations are periodically synchronized from the active NPN to the standby NPN. More specifically, an anti-replay sequence window of, for example, 1,024 bytes is used (e.g., or other window sizes can similarly be used, such as 4,096 bytes, etc.), and the NPN will verify that the packets received are within the valid anti-replay sequence window (e.g., else the packets will be disregarded/dropped if outside the relevant sequence).

However, when the active NPN goes down/is unavailable, then there can be a processing lag between the failover from the active NPN to the standby NPN. This presents a technical challenge for estimating the IPSec sequence number for our above-described anti-replay sequence window. A simplistic approach would be to add a fixed number, such as a default value of 100 packets, to the sequence numbers to account for the lag during the transition/delay for the failover between the active and standby NPNs. But this approach is potentially problematic as there may not have been any packets sent on a given branch flow during that, for example, two second transition period for the failover, or there may have been many more than that default of 100 packets, such as for a faster/higher bandwidth branch flow connection, etc.

Accordingly, in this example implementation, a prediction algorithm is disclosed for automatically and dynamically setting the Security Association (SA) replay state sequence numbers on the standby NPN (e.g., standby node) as will now be further described below. In this example implementation, the prediction algorithm utilizes a weighted average (e.g., based on recent activity associated with each given branch flow/connection) to provide an improved estimate for the IPSec sequence numbers for each branch flow/connection during a failover event.

As similarly described above, processing on the active NPN (e.g., active node) is performed. Specifically, the active NPN will periodically get each IPSec tunnel sequence number from the kernel state data and send the current sequence number update message to the standby NPN (e.g., standby node).

An example implementation of a Kernel Command to get the replay state on active NPN is provided below.

ip xfrm state {get} ID [mark MARK [mask MASK]]

As also similarly described above, processing on the standby NPN (e.g., standby node) is performed. Specifically, the standby NPN keeps track of a circular buffer of a last n sequence number updates within a time t for each IPSec tunnel (for each branch flow). As an example, the standby NPN would keep track of a circular buffer of the last 10 updates within the last 100 seconds (e.g., in which an update is received for each 10 second time period).

Prediction Algorithm to Set the SA (Security Association) Replay State Sequence Numbers on Standby Node An example implementation of a prediction algorithm for automatically and dynamically setting the Security Association (SA) replay state sequence numbers on the standby NPN (e.g., standby node) is provided below.

IPSec tunnel predicted packets per second (pps)=(w1*
pps_in_latest_seq_update+w2*pps_in_2nd_latest_
seq_update+ . . . +wn*pps_in_nth_latest_seq_update)/
(w1+w2+ . . . +wn)

As such, greater weight is given to the latest updates using this weighted prediction algorithm technique.

An example is provided below.

IPSec tunnel predicted packets per second (pps)=100*3
mbps+90*2 mbps+ - - - +10*1 mbps/100+90+ . . . +10.

The predicted number of packets transmitted during failover=IPSec tunnel predicted packets per second multiplied by the average switchover time.

As such, standby NPN will set the sequence number as last received sequence number+Predicted number of packets transmitted during failover.

An example implementation of a Kernel Command to Update the replay state on the standby NPN is provided below.

ip xfrm state {update} ID [ALGO-LIST] [mode MODE]
[mark MARK [mask MASK]][reqid REQID][seq
SEQ][replay-window SIZE][replay-seq SEQ][replay-
oseq SEQ][replay-seq-hi SEQ][replay-oseq-hi SEQ]
[flag FLAG-LIST][sel SELECTOR][LIMIT-LIST][en-
cap ENCAP][coa ADDR [/PLEN]][ctx CTX][extra-
flag EXTRAFLAG-LIST][output-mark OUTPUT-
MARK [mask MASK]][if_id IF-ID][tfcpad LENGTH]

This will ensure that the newly active NPN will process the packets without replay window drops upon the switchover during a failover event.

Additional process embodiments and techniques for enhanced SASE NPN IPSec high availability will now be further described below.

Example Process Embodiments for Enhanced Sase Network Processing Node Ipsec High Availability FIG. 5 is a flow diagram for a process for enhanced SASE NPN IPSec high availability in accordance with some embodiments. In some embodiments, a process as shown in FIG. 5 is performed by the system/service and techniques as similarly described above including the embodiments described above with respect to FIGS. 1-4.

At 502, monitoring a plurality of secure tunnels at an active network processing node (NPN) is performed, such as similarly described above with respect to FIGS. 1-4.

At 504, synchronizing periodically from the active NPN to a standby NPN is performed, such as similarly described above with respect to FIGS. 2, 3, and 4. For example, the above-described synchronization commands are performed for periodically synchronizing state objects, including security association (SA) information for SPN processing in the SASE network environment and IPSec sequence number information for each of the branch flows/sessions, utilizing kernel synchronization commands, such as similarly described above with respect to FIGS. 3 and 4.

At 506, processing each of the plurality of secure tunnels at the standby NPN using a predicted sequence number for an anti-replay sequence window for each of the plurality of secure tunnels after a failover event from the active NPN to the standby NPN is performed, such as similarly described above with respect to FIGS. 3 and 4. For example, the above-described prediction algorithm for automatically and dynamically setting the Security Association (SA) replay state sequence numbers on the standby NPN (e.g., standby node) can be applied to provide the predicted sequence number for an anti-replay sequence window for each of the plurality of secure tunnels (e.g., in which the predicted sequence number for the anti-replay sequence window for each of the plurality of secure tunnels is weighted for a recency bias).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor a plurality of secure tunnels at an active network processing node (NPN);
synchronize periodically from the active NPN to a standby NPN; and
process each of the plurality of secure tunnels at the standby NPN using a predicted sequence number for an anti-replay sequence window for each of the plurality of secure tunnels after a failover event from the active NPN to the standby NPN, wherein the active NPN and the standby NPN are associated with a Secure Access Service Edge (SASE) network, wherein the SASE network includes a plurality of security processing nodes (SPNs), and wherein branch flows are assigned by a load balancer for security processing at one of the plurality of the SPNs; and
a non-transitory memory coupled to the processor and configured to provide the processor with instructions.

2. The system of claim 1, wherein the predicted sequence number for the anti-replay sequence window for each of the plurality of secure tunnels is weighted for a recency bias.

3. The system of claim 1, wherein the SASE network includes the load balancer.

4. The system of claim 1, wherein the processor is further configured to:

periodically synchronize an IPSec sequence number for each of a plurality of branch flows from the active NPN to the standby NPN.

5. The system of claim 1, wherein the processor is further configured to:

periodically synchronize an IPSec sequence number for each of a plurality of branch flows from the active NPN to the standby NPN; and periodically synchronize a security association (SA) for each of the plurality of branch flows from the active NPN to the standby NPN.

6. A method, comprising:

monitoring a plurality of secure tunnels at an active network processing node (NPN);

synchronizing periodically from the active NPN to a standby NPN; and processing each of the plurality of secure tunnels at the standby NPN using a predicted sequence number for an anti-replay sequence window for each of the plurality of secure tunnels after a failover event from the active NPN to the standby NPN, wherein the active NPN and the standby NPN are associated with a Secure Access Service Edge (SASE) network, wherein the SASE network includes a plurality of security processing nodes (SPNs), and wherein branch flows are assigned by a load balancer for security processing at one of the plurality of the SPNs.

7. The method of claim 6, wherein the predicted sequence number for the anti-replay sequence window for each of the plurality of secure tunnels is weighted for a recency bias.

8. The method of claim 6, wherein the SASE network includes the load balancer.

9. The method of claim 6, further comprising:

periodically synchronizing an IPSec sequence number for each of a plurality of branch flows from the active NPN to the standby NPN.

10. The method of claim 6, further comprising:

periodically synchronizing an IPSec sequence number for each of a plurality of branch flows from the active NPN to the standby NPN; and periodically synchronizing a security association (SA) for each of the plurality of branch flows from the active NPN to the standby NPN.

11. A computer program product embodied in a non-transitory computer readable medium and comprising computer instructions for:

monitoring a plurality of secure tunnels at an active network processing node (NPN);

synchronizing periodically from the active NPN to a standby NPN; and processing each of the plurality of secure tunnels at the standby NPN using a predicted sequence number for an anti-replay sequence window for each of the plurality of secure tunnels after a failover event from the active NPN to the standby NPN, wherein the active NPN and the standby NPN are associated with a Secure Access Service Edge (SASE) network, wherein the SASE network includes a plurality of security processing nodes (SPNs), and wherein branch flows are assigned by a load balancer for security processing at one of the plurality of the SPNs.

12. The computer program product of claim 11, wherein the predicted sequence number for the anti-replay sequence window for each of the plurality of secure tunnels is weighted for a recency bias.

13. The computer program product recited in claim 11, wherein the SASE network includes the load balancer.

14. The computer program product recited in claim 11, further comprising:

periodically synchronizing an IPSec sequence number for each of a plurality of branch flows from the active NPN to the standby NPN.

15. The computer program product recited in claim 11, further comprising:

periodically synchronizing an IPSec sequence number for each of a plurality of branch flows from the active NPN to the standby NPN; and periodically synchronizing a security association (SA) for each of the plurality of branch flows from the active NPN to the standby NPN.

\* \* \* \* \*